Aug. 23, 1960     O. RUFFINATTI     2,949,868
APPARATUS FOR KNEADING BOILED SUGAR

Filed April 13, 1955     5 Sheets-Sheet 1

Aug. 23, 1960     O. RUFFINATTI     2,949,868
APPARATUS FOR KNEADING BOILED SUGAR

Filed April 13, 1955     5 Sheets-Sheet 2

Aug. 23, 1960 O. RUFFINATTI 2,949,868
APPARATUS FOR KNEADING BOILED SUGAR
Filed April 13, 1955 5 Sheets-Sheet 3

Inventor:
Osvaldo Ruffinatti
By Ernest Montague
Attorney

Aug. 23, 1960  O. RUFFINATTI  2,949,868
APPARATUS FOR KNEADING BOILED SUGAR
Filed April 13, 1955  5 Sheets-Sheet 5

Inventor:
Osvaldo Ruffinatti
By Ernest C Montague
Attorney

United States Patent Office 2,949,868
Patented Aug. 23, 1960

2,949,868
APPARATUS FOR KNEADING BOILED SUGAR

Osvaldo Ruffinatti, Via Cantalupo 7, Turin, Italy

Filed Apr. 13, 1955, Ser. No. 501,039

Claims priority, application Italy Jan. 11, 1955

7 Claims. (Cl. 107—33)

The present invention relates to an apparatus for kneading the boiled sugar intended for the manufacture of caramel sweets and to a machine with a cooled plate and movable arms for carrying out the process.

It is known that for the manufacture of caramel sweets it is necessary to knead the boiled sugar in order to incorporate therein small quantities of substances intended to impart flavour and perfume thereto.

This work is very difficult because it must be effected in a uniform manner and at relatively high speed, in order to avoid the mass cooling and becoming viscous and thus preventing the work from being performed; on the other hand it is not possible to increase the initial temperature of the sugar in order to avoid the latter changing colour, being transformed into caramel.

Hitherto a machine has been known for this purpose, the active member of which comprises a piston which moves vertically compressing the mass and forcing it to change shape. This is an expensive and cumbrous machine, and the work which it produces has not been found satisfactory.

It is one object of the present invention to provide a machine for kneading boiled sugar, which comprises essentially a plate which can be rotated and which is cooled by means of circulation of a fluid, two substantially horizontal arms each of which carries at its end a shovel in the form of a jaw, and the necessary means for imparting movement to the said arms and to the said rotating table.

It is yet another object of the present invention to provide a machine for kneading boiled sugar, which consists in an asymmetrical arrangement of the shovels or jaws, one of them ending in a knife edge and the other with an edge of relatively great thickness, so as to force the mass to turn upon itself, when the jaws are in their closest position.

It is a still further object of the present invention to provide a machine for kneading boiled sugar, which includes means for obtaining, from a single electric motor, two operating speeds, so that the work can be controlled at a relatively high speed and then continued slowly when the cooler mass presents a greater resistance.

It is also yet another object of the present invention to provide a machine for kneading boiled sugar in which all the movements of the work table and of the arms are synchronized, being derived from one single shaft by means of a group of cams.

With these and other objects in view which will become apparent in the following detailed description, the present invention will be clearly understood in connection with the accompanying drawings, in which.

Figure 1:
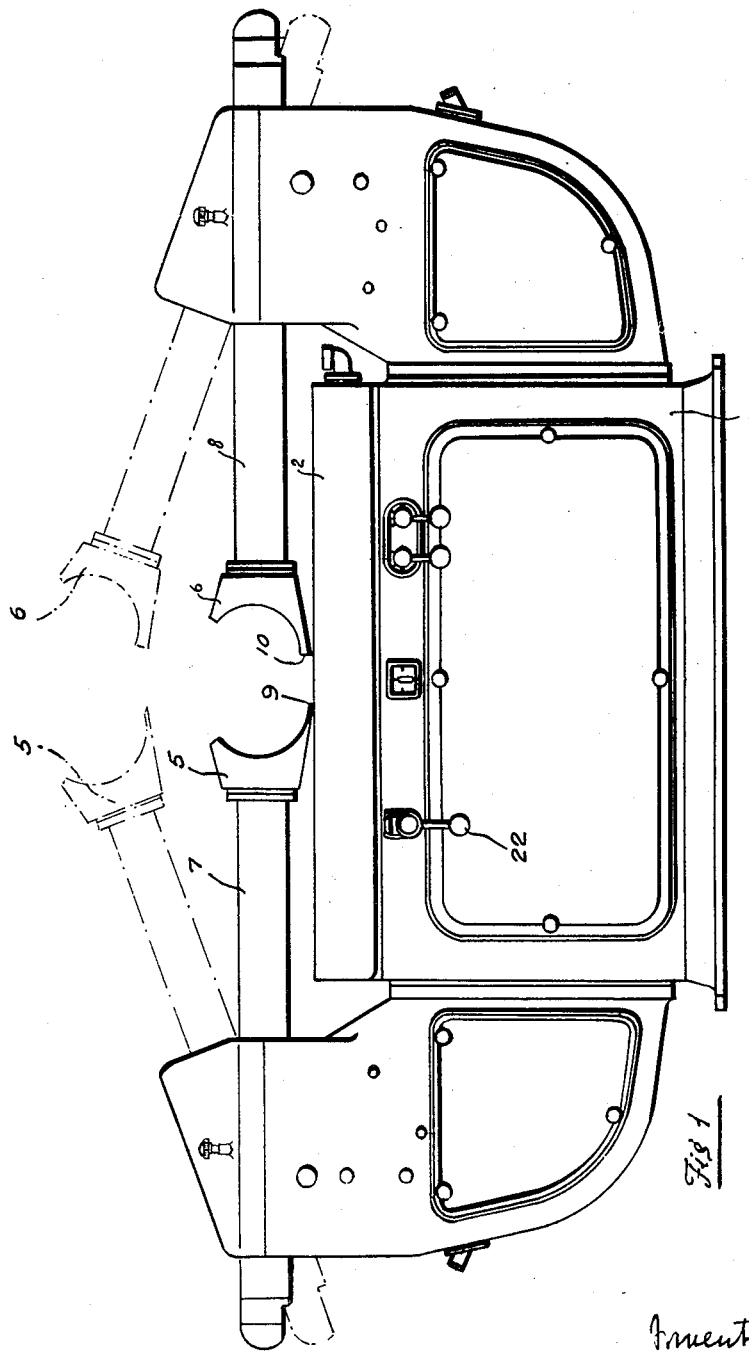
Figure 1 represents a front elevation of the machine with its covers.
Figure 2:
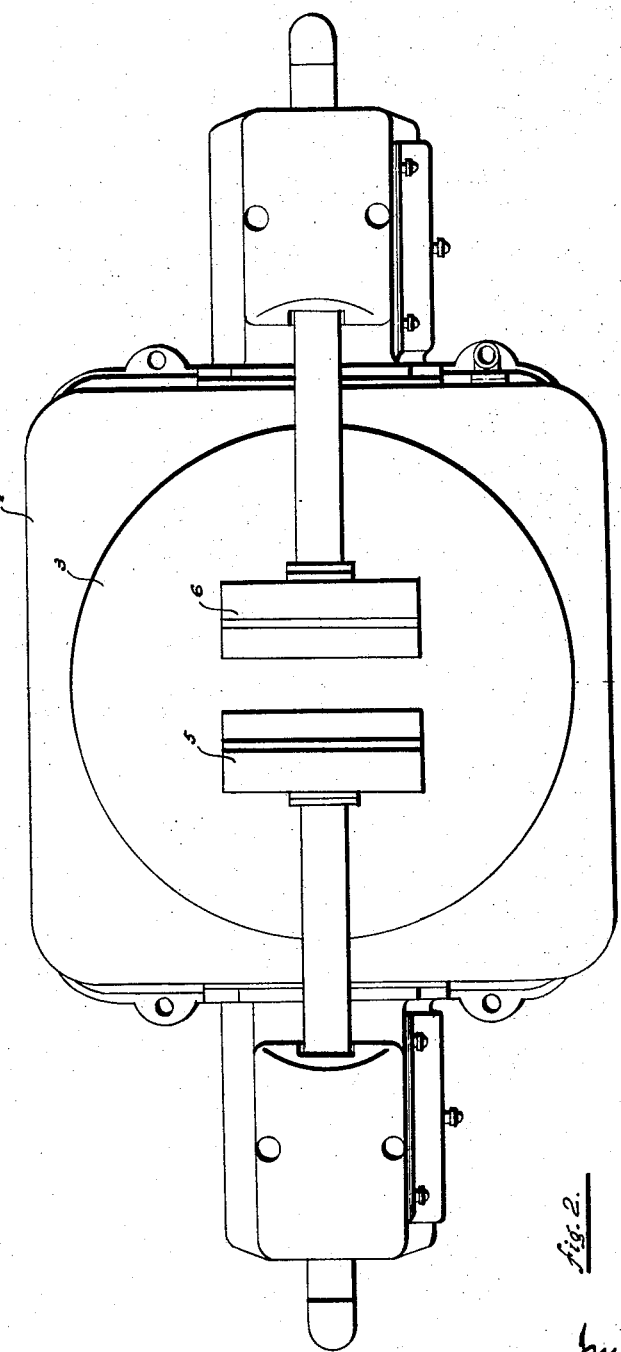
Figure 2 is a top plan view thereof.

Referring now to the drawing and in particular to Fig. 1, the machine comprises a frame 1 enclosing the different movement-transmission members and carrying at its higher end a table 2 the design of which is shown more clearly in Fig. 2, comprising a cylindrical basin 3 of limited height, and a raised enclosure 4. Beneath the cylindrical part there is a cavity through which cooling water flows.

Upon the table 2 there can slide the ends 5 and 6 of two shovels in the form of jaws carried by the arms 7 and 8, which can be subjected to movements approaching one another and also withdrawal movements, and further can be raised or lowered, respectively, as will be better explained hereinafter.

The position into which the shovels are raised is indicated in Fig. 1 in dotted lines.

It will be noted that the shovel 5 has a lower edge 9 with a cutting edge, while the shovel 6 has a substantially blunted edge 10.

Figure 3:
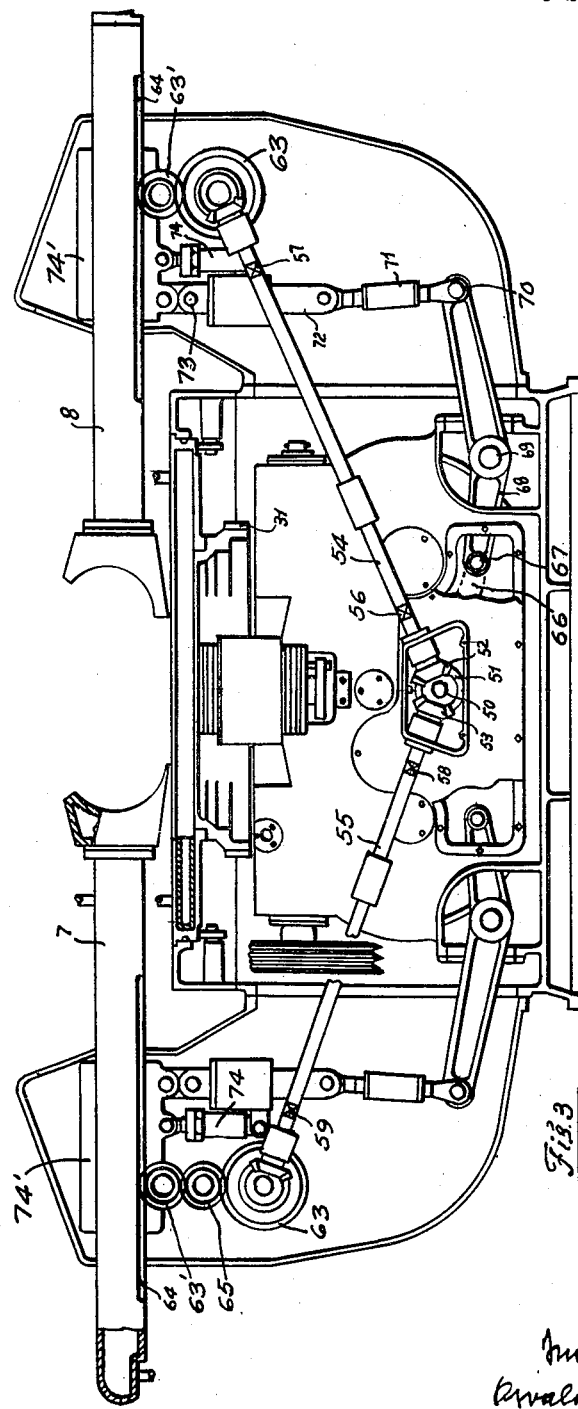
Fig. 3 is a front elevation, showing the operating mechanism.
Figure 4:
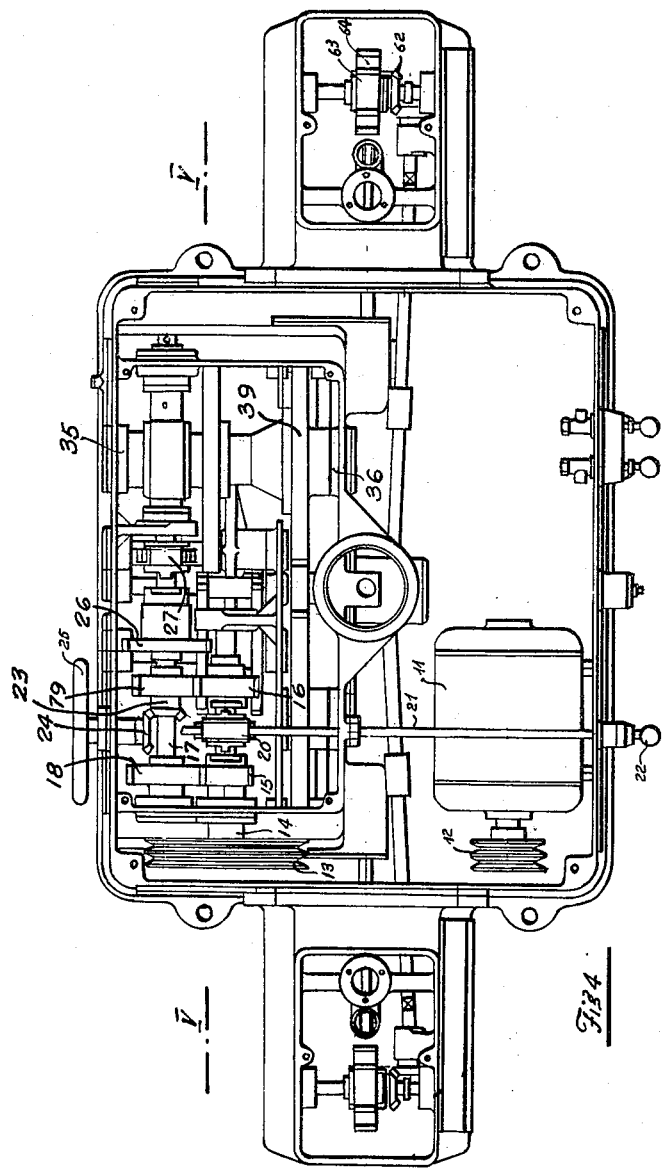
Fig. 4 is a top plan, the arms, the rotating table, and the covers being removed for better showing.
Figure 5:
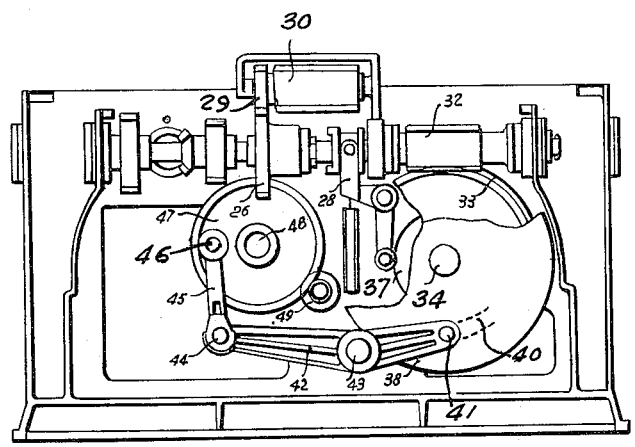
Fig. 5 is a vertical section along the lines V—V of Fig. 4.

The means causing and transmitting the different movements are represented in Figs. 3, 4 and 5.

The motor 11 actuates the pulley 13, by means of the pulley 12 and a set of trapezoidal belts (not shown) which pulley 13 rotates the shaft 14 upon which there is supported, in freely rotatable fashion, the toothed wheel 15, and at the opposite end the toothed wheel 16, which is also loose on the shaft 14. Opposite the latter there is placed a counter-shaft 17 extending approximately over the entire length of the frame and carrying a fixed wheel 18 meshing with the said loose wheel 15, and a wheel 19, similarly fixed, meshing with the loose wheel 16.

Above the shaft 14 and between the said loose wheels 15 and 16 there is placed a coupling sleeve 20 actuated by a fork (not shown) which is controlled by a rotating arm 21 actuated in turn by the lever 22. This sleeve 20 carries teeth which can mesh with one or the other of the loose wheels 15 and 16 for common rotation with the shaft 14.

The wheels 15 and 16 have different diameters and therefore the transmission of movement from the wheel 15 to the wheel 18 corresponds to a speed reduction, while the transmission between the wheel 16 and the wheel 19 (having the same diameter) takes place without variation of angular speed.

Upon the shaft 17 there is also a fixed bevel gear 23 meshing with another bevel gear 24, the shaft of which projects through the frame 1 of the machine and can similarly be actuated by means of the small hand wheel 25.

Upon the same shaft 17 there is also loosely mounted the gear 26, which can be coupled by action of the sleeve 27 controlled by the fork 28.

The gear 26 is continually in mesh with the gear 29 which is fixed on the shaft of the worm gear 30 intended to effect the rotation of the basin 3. To this end the worm 30 meshes with the helicoidal gear 31 (Fig. 3) which is mounted on the basin 3.

Also upon the shaft 17 there is fixed the worm gear 32 controlling the group of different cams as will be better explained hereinafter.

As will be seen in Fig. 5, the worm gear 32 meshes with a helicoidal gear 33 mounted on the spindle 34 which is in turn supported in the bearings 35 and 36 (Fig. 4) and carries three cams indicated by 37, 38, 39.

The first of these controls the fork 28 causing the coupling with the basin 3, the second, indicated by 38, controls the alternating, substantially horizontal movement of the arms 7 and 8, while the third, indicated by 39, controls the raising and lowering of these same arms.

As is seen from Fig. 5, the cam 38 carries a groove 40 into which there is introduced the pivoted end 41 of a rocking lever 42 centered at 43 and connected at the other end 44 in hinged fashion with the end of a connecting rod 45 the foot of which is pivoted at 46 on a projecting pivot of the gear 47, the spindle of which is at 48 and which engages with the pinion 49 with spindle at 50 in turn carrying a bevel pinion 51 (Fig. 3) which at the same time meshes with two bevel pinions 52, 53 carried respectively by the shafts 54 and 55. Each of these shafts is connected at the ends by a universal or Cardan joint 56, 57 and 58, 59, respectively, to the corresponding bevel pinion.

The outer pinion meshes on the right hand part of Figs. 3 and 4 with the bevel gear 62, coaxial with the cylindrical gear 63 meshing with the cylindrical gear 63'. The latter is in mesh with a rack 64 fast with the arm 8 and serving to control the horizontal movements.

On the opposite side (corresponding to the left-hand part of Figs. 3 and 4) a similar transmission system also has a wheel 65 serving to reverse the direction of the movement.

The cam 39 in turn has a channel 66 (Fig. 3) into which there penetrates the pivoted end of the rocking lever 68 pivoted at 69, which, by means of the other arm, is connected in hinged fashion at 70 to the connecting rod 71 of the push-rod 72 connected in articulated fashion at 73 with the sleeve 74' which, by means of members not shown, is in turn pivoted on the spindle of the gear 63' producing the advancement of the arm.

This arrangement is similar on the opposite side with the exception of the fact that the transmission system also comprises the wheel 65 for the reversal of the movement of the corresponding arm.

The shovels 5 and 6 and their arms are hollow and are cooled by circulation of a fluid, generally by circulation of water. The arms 7 and 8 are carried by sleeves 74' movable about an axis coinciding with the spindle of the gear 63', being under the action of the push-rods 73 and are similarly supported by shock-absorbers 74 which brake their movement during descent.

The operation of the machine which has just been described can take place in three ways, namely (1) by manual control, (2) by motor control at high speed, and (3) by motor control, at slow speed.

The manual control serves solely for effecting a small movement, for example for setting the machine, and is effected by acting on the hand-wheel 25 which is situated outside the frame; by means of the pair of gear wheels 24, 23 the shaft 17 is actuated and consequently all the movements described hereinafter are caused at a very low speed.

When the machine is manually operated, the lever 22 is kept in the central position corresponding to the neutral position of the coupling 20, the gears 15 and 16 remain loose and there is no transmission between the shaft 14 and the shaft 17.

On the other hand, when the lever 22 is shifted into the right-hand position (Fig. 4) the coupling 20 renders the gear 16 active, which, by means of the gear 19, actuates the shaft 17 causing it to rotate at the same speed as the shaft 14; which is the normal operating condition of the machine.

Finally if the lever 22 is shifted into the left-hand position (Fig. 4) the coupling 20 connects the shaft 14 with the gear 15 and, therefore, the rotation of the shaft 17 is produced through the intermediary of the gear 18, with speed reduction.

It is apparent that in the three cases the movement of the arms 7, 8 and the movement of the table 2 will take place always in the same fashion, it always being a matter of the rotation of the shaft 17 which, by means of the worm 32, is transmitted to the different cams mounted on the shaft 34. Therefore, there is no synchronism or, respectively, succession of the different operations, the peripheral contour of each cam being made to correspond to one rotation of the shaft 34 and having active curves and rest curves at suitable intervals and in a suitable reciprocal phase.

At the commencement of the work the central basin 3 is at rest and the shovels 5 and 6 are apart from one another, touching the table 2 lightly.

The boiled sugar to be kneaded is poured into the middle of the basin 3.

The motor 11 is started, and by shifting the coupling 20 into the right-hand position (Fig. 4), the shaft 17 is actuated by the gears 16, 19, causing it to rotate at the same speed as the shaft 14.

By action of the cam 38 (Fig. 5), by means of the rocking lever 42 and the connecting rod 45 the spindle 50 (Fig. 3) is rotated, which, by means of the pairs of bevel gears 51, 52 and 51, 53 respectively, rotates the shafts 54, 55, the first of which rotates the gear 63' (Fig. 3) in an anti-clockwise direction, then it causes the arm 8 to move to the left, while the shaft 55, by reason of the arrangement of the intermediate wheel 65, rotates the gear 63 controlling the arm 7 in a clockwise direction and therefore causes the said arm to advance to the right.

Thus the two shovels 5, 6 approach one another to a position wherein they are apart about 10 cm. In this movement the rocking lever 42 and the connecting rod 45 communicate to the shaft 50 a rotation in the opposite direction, and the arms 7, 8 commence to depart from one another, without rising, and therefore the mass receives a first treatment.

Immediately afterwards there is another approaching movement of these arms, which rise at the same time. This rising is produced by the fact that in this phase the cam 39 becomes active (Fig. 3), the rocking lever 68 shifts the connecting rod 71 and lifts the sleeve 74' causing it to rotate about the spindle of the wheel 63' upon which it is pivoted (a similar movement takes place for the arm 7). At the end of this movement the arms 7 and 8 are disposed in the position indicated in dotted lines in Fig. 1. In a third phase there is lowering of the arms 7, 8, without withdrawal; their descending motion is suitably braked by the shock-absorbers 74.

In a fourth phase there is rotation of the shafts 54, 55 in an opposite direction to the former and therefore the arms depart, returning to the initial position.

At this moment, the cams 38 and 39 being inactive, the cam 37 comes into action, causing the fork 28 to shift bringing about the actuation of the gears 26, 29 and of the worm 30, causing the basin 3 to rotate through a quarter of a revolution.

The cycle of the operations corresponding to one revolution of the shaft 34 has been achieved, then being repeated a certain number of times.

When the material to be kneaded, for example as a result of its cooling, has become more viscous and presents a greater resistance, it is advantageous to continue the work at a lower speed, using the transmission by the pair of gears 15, 18 as has been stated above.

It has been stated above that the shovels 5, 6 are of different shapes, the former having at the bottom a cutting edge 9, the latter a blunt edge 10. This fact gives rise to an asymmetrical action upon the material to be kneaded, and causes a rotation of the said material upon itself, which renders the action of the shovels more uniform.

The machine which has just been described ensures a rapid and complete working up in a very short time, and it gives much better results than the known, vertical piston machines.

While I have disclosed one embodiment of the present invention, it is to be understood that this embodiment is given by example only and not in a limiting sense, the scope of the present invention being determined by the objects and the claims.

I claim:

1. An apparatus for kneading boiled sugar comprising a frame, a table rotatably mounted on said frame, a pair of opposite arms disposed diametrically across said table with confronting ends, supporting means being mounted on said frame which means permits the arms to slide endwise toward and away from one another along their respective longitudinal axes, each of said arms carrying a shovel, a drive mounted to said frame, said drive including cam means causing narrowing the initial gap between said shovels towards each other, lifting of said shovels by a swinging movement of said arms in a plane lying vertically along the longitudinal axes of the arms about horizontal axes transverse to the longitudinal axes of said arms, and lowering and simultaneous withdrawal of said shovels into their original position, said table, arms and shovels being hollow, and including means for feeding a cooling medium to said table, said arms and said shovels, respectively.

2. The apparatus, as set forth in claim 1, in which the said shovels have an open mouth forming part of a cylinder, and one of said shovels has a lower cutting edge and the other of said shovels has a lower blunt edge.

3. The apparatus, as set forth in claim 1, in which said drive includes a cam shaft, and in which said cam means include three cams operated by said cam shaft, one of said cams causing intermittent rotation of said table, another of said cams operating the said advancing and withdrawing movement, respectively, of said arms, and still another of said cams operating the said raising and lowering movement, respectively, of said shovels.

4. The apparatus, as set forth in claim 3, which includes a speed reducer disposed between said drive and said cam shaft.

5. The apparatus, as set forth in claim 1, in which said cam means includes a cam shaft and a hand operated shaft connected thereto.

6. The apparatus, as set forth in claim 1, wherein each of said arms has a rack, and a gear meshing with said rack, said gear being part of a gear train operated by said drive, and a sleeve surrounding the rack carrying portion of said arms and supporting the latter.

7. The apparatus, as set forth in claim 6, which includes a shock absorber disposed between said sleeve and said frame in order to brake the lowering movement of said arms.

References Cited in the file of this patent

UNITED STATES PATENTS

| | | |
|---|---|---|
| 790,920 | Richards | May 30, 1905 |
| 906,271 | Palmer et al. | Dec. 8, 1908 |
| 968,110 | Barbieri | Aug. 23, 1910 |
| 1,044,967 | Aeschbach | Nov. 19, 1912 |
| 1,639,319 | Weber et al. | Aug. 16, 1927 |
| 1,757,384 | Ponisch | May 6, 1930 |

FOREIGN PATENTS

| | | |
|---|---|---|
| 169,679 | Switzerland | Aug. 16, 1934 |
| 278,597 | Germany | Oct. 1, 1914 |